United States Patent
Steiner et al.

(10) Patent No.: US 9,763,124 B2
(45) Date of Patent: Sep. 12, 2017

(54) APPARATUS, SYSTEM AND METHOD OF PERFORMING A WIRELESS ASSOCIATION

(71) Applicant: INTEL IP CORPORATION, Santa Clara, CA (US)

(72) Inventors: Itai Steiner, Tel Aviv (IL); Matan Levy, Zur Moshe (IL)

(73) Assignee: INTEL IP CORPORATION, Santa Clara, CA (US)

( * ) Notice: Subject to any disclaimer, the term of this patent is extended or adjusted under 35 U.S.C. 154(b) by 0 days.

(21) Appl. No.: 14/669,466

(22) Filed: Mar. 26, 2015

(65) Prior Publication Data
US 2016/0286542 A1 Sep. 29, 2016

(51) Int. Cl.
| | | |
|---|---|---|
| G01S 1/24 | (2006.01) |
| H04W 4/00 | (2009.01) |
| H04W 36/00 | (2009.01) |
| H04W 40/00 | (2009.01) |
| H04W 72/00 | (2009.01) |
| H04W 24/08 | (2009.01) |
| H04W 48/20 | (2009.01) |
| H04W 48/16 | (2009.01) |

(52) U.S. Cl.
CPC ........... H04W 24/08 (2013.01); H04W 48/20 (2013.01); H04W 48/16 (2013.01)

(58) Field of Classification Search
None
See application file for complete search history.

(56) References Cited

U.S. PATENT DOCUMENTS

| | | | |
|---|---|---|---|
| 2007/0213029 A1* | 9/2007 | Edney et al. | 455/404.1 |
| 2013/0039275 A1* | 2/2013 | Patil et al. | 370/328 |
| 2013/0177002 A1 | 7/2013 | Sun et al. | |
| 2013/0294232 A1 | 11/2013 | Segev et al. | |
| 2014/0078910 A1* | 3/2014 | Schatzberg | H04W 36/0061 370/252 |
| 2014/0254502 A1 | 9/2014 | Cai et al. | |

(Continued)

FOREIGN PATENT DOCUMENTS

| | | |
|---|---|---|
| WO | 2009021618 | 2/2009 |
| WO | 2014008238 | 1/2014 |

OTHER PUBLICATIONS

IEEE Std 802.11™-2012. IEEE Standard for Information technology—Telecommunications and information exchange between systems Local and metropolitan area networks—Specific requirements Part 11: Wireless LAN Medium Access Control (MAC) and Physical Layer (PHY) Specifications, Mar. 29, 2012, 2793 pages.

(Continued)

*Primary Examiner* — Moustapha Diaby
(74) *Attorney, Agent, or Firm* — Shichrur & Co.

(57) ABSTRACT

Some demonstrative embodiments include apparatuses, systems and/or methods of performing a wireless association. For example, a mobile device may include a radio to receive from a wireless communication station a frame including an association capability indication, the association capability indication to indicate a capability of the wireless communication station to perform a wireless association; and a controller to initiate an association procedure with the wireless communication station based on the capability information.

22 Claims, 6 Drawing Sheets

(56) References Cited

U.S. PATENT DOCUMENTS

2014/0269476 A1* 9/2014 Weston et al. ................ 370/311
2014/0301219 A1* 10/2014 Ben-Haim et al. ........... 370/252

OTHER PUBLICATIONS

Wi-Fi Alliance Technical Committee P2P Task Group; Wi-Fi Peer-to-Peer (P2P) Technical Specification; Version 1.2; Dec. 14, 2011; 160 pages.
International Search Report and Written Opinion for PCT/US2016/019497, mailed on Jun. 23, 2016, 12 pages.

* cited by examiner

APPARATUS, SYSTEM AND METHOD OF PERFORMING A WIRELESS ASSOCIATION

TECHNICAL FIELD

Embodiments described herein generally relate to performing a wireless association.

BACKGROUND

Various applications use range information between devices.

The range information may enable, for example, to estimate a location of a mobile device with respect to a coordinate set, for example, using a trilateration method.

The range information may be determined using a Time-of-Flight (ToF) measurement procedure and/or Fine Time Measurement (FTM) procedure.

The mobile device may discover nearby wireless communication stations, e.g., based on a beacon frame, a probe response frame, and/or any other type of frame.

The mobile device may communicate with the nearby wireless communication stations to perform the Time-of-Flight (ToF) measurement procedure and/or the Fine Time Measurement (FTM) procedure.

The mobile device may attempt to associate with one or more of the nearby wireless communication stations, e.g., based on the beacon frame, the probe response frame, and/or any other frame.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
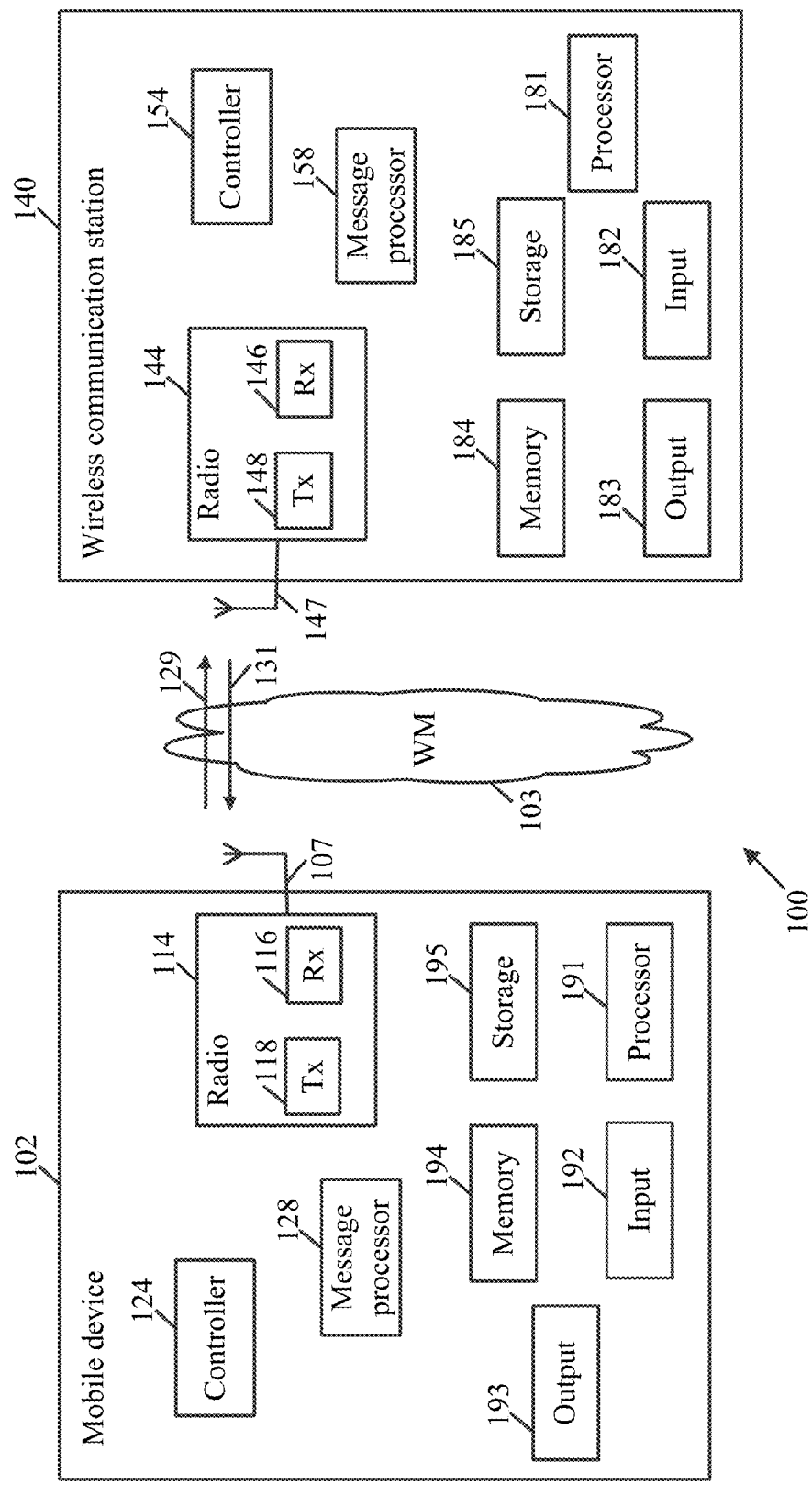
FIG. 1 is a schematic block diagram illustration of a system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments" etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

Some embodiments may be used in conjunction with various devices and systems, for example, a User Equipment (UE), a Mobile Device (MD), a wireless station (STA), a Time of Flight (ToF) responder, an Internet of Things (IoT) device, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with devices and/or networks operating in accordance with existing Wireless Fidelity (WiFi) Alliance (WFA) Specifications (including the WFA Neighbor Awareness Networking (NAN) Specification, and WFA Peer-to-Peer (P2P) specifications (*WiFi P2P technical specification, version* 1.2, 2012)) and/or future versions and/or derivatives thereof, devices and/or networks operating in accordance with existing Wireless-Gigabit-Alliance (WGA) specifications (*Wireless Gigabit Alliance, Inc WiGig MAC and PHY Specification Version* 1.1, *April* 2011, *Final specification*) and/or future versions and/or derivatives thereof, devices and/or networks operating in accordance with existing IEEE 802.11 standards (*IEEE 802.11-2012, IEEE Standard for Information technology—Telecommunications and information exchange between systems Local and metropolitan area networks—Specific requirements Part 11: Wireless LAN Medium Access Control (MAC) and Physical Layer (PHY) Specifications, Mar. 29, 2012; IEEE802.11ac-2013 ("IEEE P802.11ac-2013, IEEE Standard for Information Technology—Telecommunications and Information Exchange Between Systems Local and Metropolitan Area Networks—Specific Requirements—Part 11: Wireless LAN Medium Access Control (MAC) and Physical Layer (PHY) Specifications—Amendment 4: Enhancements for Very High Throughput for Operation in Bands below 6 GHz", December, 2013); IEEE 802.11ad ("IEEE P802.11ad-2012, IEEE Standard for Information Technology Telecommunications and Information Exchange Between Systems—Local and Metropolitan Area Networks—Specific Requirements—Part 11: Wireless LAN Medium Access Control (MAC) and Physical Layer (PHY) Specifications—Amendment 3: Enhancements for Very High Throughput in the 60 GHz Band", 28 Dec., 2012); and/or IEEE-802.11REVmc ("IEEE 802.11-REVmc™/D3.0, June 2014 draft standard for Information technology—Telecommunications and information exchange between systems Local and metropolitan area networks Specific requirements; Part 11: Wireless LAN Medium Access Control (MAC) and Physical Layer (PHY) Specification"*)) and/or future versions and/or derivatives thereof, devices and/or networks operating in accordance with existing cellular specifications and/or protocols, e.g., 3rd Generation Partnership Project (3GPP), 3GPP Long Term Evolution (LTE) and/or future versions and/or derivatives thereof, units and/or devices which are part of the above networks, and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Orthogonal Frequency-Division Multiple Access (OFDMA), Spatial Divisional Multiple Access (SDMA), FDM Time-Division Multiplexing (TDM), Time-Division Multiple Access (TDMA), Multi-User MIMO (MU-MIMO), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G) mobile networks, 3GPP, Long Term Evolution (LTE), LTE advanced, Enhanced Data rates for GSM Evolution (EDGE), or the like. Other embodiments may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

The term "communicating" as used herein with respect to a communication signal includes transmitting the communication signal and/or receiving the communication signal. For example, a communication unit, which is capable of communicating a communication signal, may include a transmitter to transmit the communication signal to at least one other communication unit, and/or a communication receiver to receive the communication signal from at least one other communication unit. The verb communicating may be used to refer to the action of transmitting or the action of receiving. In one example, the phrase "communicating a signal" may refer to the action of transmitting the signal by a first device, and may not necessarily include the action of receiving the signal by a second device. In another example, the phrase "communicating a signal" may refer to the action of receiving the signal by a first device, and may not necessarily include the action of transmitting the signal by a second device.

Some demonstrative embodiments may be used in conjunction with a WLAN, e.g., a wireless fidelity (WiFi) network. Other embodiments may be used in conjunction with any other suitable wireless communication network, for example, a wireless area network, a "piconet", a WPAN, a WVAN and the like.

Some demonstrative embodiments may be used in conjunction with a wireless communication network communicating over a frequency band of 2.4 GHz or 5 GHz. However, other embodiments may be implemented utilizing any other suitable wireless communication frequency bands, for example, an Extremely High Frequency (EHF) band (the millimeter wave (mmWave) frequency band), e.g., a frequency band within the frequency band of between 20 Ghz and 300 GHZ, a WLAN frequency band, a WPAN frequency band, and the like.

The term "antenna", as used herein, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/receive elements. The antenna may include, for example, a phased array antenna, a single element antenna, a set of switched beam antennas, and/or the like.

The term "station" (STA), as used herein, may include any logical entity that is a singly addressable instance of a medium access control (MAC) and a physical layer (PHY) interface to a wireless medium (WM).

The phrase "access point" (AP), as used herein, may include an entity that contains one station (STA) and provides access to distribution services, via the WM for associated STAs.

The phrase "non-access-point (non-AP) station (STA)", as used herein, may relate to a STA that is not contained within an AP.

The phrase "peer to peer (PTP or P2P) communication", as used herein, may relate to device-to-device communication over a wireless link ("peer-to-peer link") between a pair of devices. The P2P communication may include, for example, wireless communication over a direct link within a QoS basic service set (BSS), a tunneled direct-link setup (TDLS) link, a STA-to-STA communication in an independent basic service set (IBSS), or the like.

Reference is now made to FIG. 1, which schematically illustrates a block diagram of a system 100, in accordance with some demonstrative embodiments.

As shown in FIG. 1, in some demonstrative embodiments system 100 may include a wireless communication network including one or more mobile devices, e.g., a mobile device 102, and/or one or more wireless communication devices, e.g., a wireless communication station 140.

In some demonstrative embodiments, mobile device 102 may include, for example, a User Equipment (UE), a MD, a STA, a mobile computer, a laptop computer, a notebook computer, a tablet computer, an Ultrabook™ computer, an Internet of Things (IoT) device, a mobile internet device, a handheld computer, a handheld device, a storage device, a PDA device, a handheld PDA device, an on-board device, an off-board device, a hybrid device, a consumer device, a vehicular device, a non-vehicular device, a portable device, a mobile phone, a cellular telephone, a PCS device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), an "Origami" device or computing device, a video device, an audio device, an A/V device, a gaming device, a media player, a Smartphone, or the like.

In some demonstrative embodiments, mobile device 102 may include, for example, one or more of a processor 191, an input unit 192, an output unit 193, a memory unit 194, and a storage unit 195; and/or wireless communication station 140 may include, for example, one or more of a processor 181, an input unit 182, an output unit 183, a memory unit 184, and a storage unit 185. Mobile device 102 and/or wireless communication station 140 may optionally include other suitable hardware components and/or software components. In some demonstrative embodiments, some or all of the components of mobile device 102 and/or wireless communication station 140 may be enclosed in a common housing or packaging, and may be interconnected or operably associated using one or more wired or wireless links. In other embodiments, components of mobile device 102 and/or wireless communication station 140 may be distributed among multiple or separate devices.

Processor 191 and/or processor 181 includes, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 191 executes instructions, for example, of an Operating System (OS) of mobile device 102 and/or of one or more suitable applications. Processor 181 executes instructions, for example, of an Operating System (OS) of wireless communication station 140 and/or of one or more suitable applications.

Input unit 192 and/or input unit 182 includes, for example, a keyboard, a keypad, a mouse, a touch-screen, a touch-pad, a track-ball, a stylus, a microphone, or other suitable pointing device or input device. Output unit 193 and/or output unit 183 includes, for example, a monitor, a screen, a touch-screen, a flat panel display, a Light Emitting Diode (LED) display unit, a Liquid Crystal Display (LCD) display unit, a plasma display unit, one or more audio speakers or earphones, or other suitable output devices.

Memory unit 194 and/or memory unit 184 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 195 and/or storage unit 185 includes, for example, a hard disk drive, a floppy disk drive, a Compact Disk (CD) drive, a CD-ROM drive, a DVD drive, or other suitable removable or non-removable storage units. Memory unit 194 and/or storage unit 195, for example, may store data processed by mobile device 102. Memory unit 184 and/or storage unit 185, for example, may store data processed by wireless communication station 140.

In some demonstrative embodiments, mobile device 102 and/or wireless communication station 140 may be capable of communicating content, data, information and/or signals via a wireless medium (WM) 103. In some demonstrative embodiments, wireless medium 103 may include, for example, a radio channel, a cellular channel, a Global Navigation Satellite System (GNSS) Channel, an RF channel, a Wireless Fidelity (WiFi) channel, an IR channel, a Bluetooth (BT) channel, and the like.

In some demonstrative embodiments, wireless medium 103 may include a wireless communication channel over a 2.4 Gigahertz (GHz) frequency band, a 5 GHz frequency band, a millimeterWave (mmWave) frequency band, e.g., a 60 GHz frequency band, a Sub 1 Gigahertz (S1G) band, and/or any other frequency band.

In some demonstrative embodiments, mobile device 102 and wireless communication station 140 may include one or more radios including circuitry and/or logic to perform wireless communication between mobile device 102, wireless communication station 140, and/or one or more other wireless communication devices. For example, mobile device 102 may include a radio 114, and/or wireless communication station 140 may include a radio 144.

In some demonstrative embodiments, radios 114 and/or 144 may include one or more wireless receivers (Rx) including circuitry and/or logic to receive wireless communication signals, RF signals, frames, blocks, transmission streams, packets, messages, data items, and/or data. For example, radio 114 may include a receiver 116, and/or radio 144 may include a receiver 146.

In some demonstrative embodiments, radios 114 and/or 144 may include one or more wireless transmitters (Tx) including circuitry and/or logic to send wireless communication signals, RF signals, frames, blocks, transmission streams, packets, messages, data items, and/or data. For example, radio 114 may include a transmitter 118, and/or radio 144 may include a transmitter 148.

In some demonstrative embodiments, radios 114 and/or 144 may be configured to communicate over a 2.4 GHz band, a 5 GHz band, a mmWave band, a S1G band, and/or any other band.

In some demonstrative embodiments, radios 114 and/or 144 may include circuitry and/or logic, modulation elements, demodulation elements, amplifiers, analog to digital and digital to analog converters, filters, and/or the like. In one example, radios 114 and/or 144 may include or may be implemented as part of a wireless Network Interface Card (NIC), and the like.

In some demonstrative embodiments, radios 114 and/or 144 may include, or may be associated with, one or more antennas 107 and/or 147, respectively.

In one example, mobile device 102 may include a single antenna 107. In other example, device 102 may include two or more antennas 107.

In one example, wireless communication station 140 may include a single antenna 147. In other example, device 140 may include two or more antennas 147.

Antennas 107 and/or 147 may include any type of antennas suitable for transmitting and/or receiving wireless communication signals, blocks, frames, transmission streams, packets, messages and/or data. For example, antennas 107 and/or 147 may include any suitable configuration, structure and/or arrangement of one or more antenna elements, components, units, assemblies and/or arrays. Antennas 107 and/or 147 may include, for example, antennas suitable for directional communication, e.g., using beamforming techniques. For example, antennas 107 and/or 147 may include a phased array antenna, a multiple element antenna, a set of switched beam antennas, and/or the like. In some embodiments, antennas 107 and/or 147 may implement transmit and receive functionalities using separate transmit and receive antenna elements. In some embodiments, antennas 107 and/or 147 may implement transmit and receive functionalities using common and/or integrated transmit/receive elements.

In some demonstrative embodiments, mobile device 102 may include a controller 124, and/or wireless communication station 140 may include a controller 154. Controllers 124 and/or 154 may be configured to perform one or more communications, operations and/or procedures between mobile device 102 and wireless communication station 140, e.g., as described below.

In some demonstrative embodiments, controllers 124 and/or 154 may include circuitry and/or logic, e.g., one or more processors including circuitry, memory circuitry, Media-Access Control (MAC) circuitry and/or logic, Physical Layer (PHY) circuitry and/or logic, and/or any other circuitry and/or logic, configured to perform the functionality of controllers 124 and/or 154, respectively. Additionally or alternatively, one or more functionalities of controllers 124 and/or 154 may be implemented by logic, which may be executed by a machine and/or one or more processors, e.g., as described below.

In some demonstrative embodiments, mobile device 102 may include a message processor 128 configured to generate, process and/or access one of messages communicated by mobile device 102.

In one example, message processor 128 may be configured to generate one or more messages to be transmitted by mobile device 102, and/or message processor 128 may be configured to access and/or to process one or more messages received by mobile device 102, e.g., as described below.

In some demonstrative embodiments, wireless communication station 140 may include a message processor 158 configured to generate, process and/or access one or more messages communicated by wireless communication station 140.

In one example, message processor 158 may be configured to generate one or more messages to be transmitted by wireless communication station 140, and/or message processor 158 may be configured to access and/or to process one or more messages received by wireless communication station 140, e.g., as described below.

In some demonstrative embodiments, message processors 128 and/or 158 may include circuitry, e.g., processor circuitry, memory circuitry, Media-Access Control (MAC) circuitry, Physical Layer (PHY) circuitry, and/or any other circuitry, configured to perform the functionality of message processors 128 and/or 158. Additionally or alternatively, one or more functionalities of message processors 128 and/or 158 may be implemented by logic, which may be executed by a machine and/or one or more processors, e.g., as described below.

In some demonstrative embodiments, at least part of the functionality of message processor 128 may be implemented as part of radio 114, and/or at least part of the functionality of message processor 158 may be implemented as part of radio 144.

In some demonstrative embodiments, at least part of the functionality of message processor 128 may be implemented as part of controller 124, and/or at least part of the functionality of message processor 158 may be implemented as part of controller 154.

In other embodiments, the functionality of message processor 128 may be implemented as part of any other element of mobile device 102, and/or the functionality of message processor 158 may be implemented as part of any other element of wireless communication station 140.

In some demonstrative embodiments, wireless communication station 140 may perform the functionality of a wireless communication station, which is capable of performing a wireless association. For example, wireless communication station 140 may perform the functionality of an AP.

In other demonstrative embodiments, wireless communication station 140 may perform the functionality of a wireless communication station, which is not capable of performing the wireless association. For example, wireless communication station 140 may perform the functionality of a ToF responder.

In some demonstrative embodiments, mobile device 102 may determine an indoor position of mobile device 102.

For example, mobile device 102 may include one or more applications configured to provide and/or to use one or more location based services over WM 103, e.g., a social application, a navigation application, a location based advertising application, and/or the like. According to this example, mobile device 102 may need to determine the indoor position of mobile device 102 to be able to use the one or more applications.

In some demonstrative embodiments, mobile device 102 may determine the indoor position of mobile device 102, e.g., based on a measurement procedure.

In one example, the measurement procedure may include a Time of Flight (ToF) measurement procedure.

In another example, the measurement procedure may include a Fine-Time-Measurement (FTM) procedure.

In another example, the measurement procedure may include any other procedure for determining the indoor position of mobile device 102.

In some demonstrative embodiments, mobile device 102 may discover one or more wireless communication stations.

For example, mobile device 102 may discover the one or more wireless communication stations in order to perform the measurement procedure.

In some demonstrative embodiments, the one or more wireless communication stations may include one or more APs and/or one or more ToF responders.

For example, mobile device 102 may discover wireless communication station 140. According to this example, wireless communication station 140 may perform the functionality of the AP, or the ToF responder.

In some demonstrative embodiments, adding the one or more ToF responders to a network including the one or more APs may increase a coverage area and/or an accuracy of the measurement procedure.

In some demonstrative embodiments, the one or more ToF responders may not require a backhaul network connection to operate. According to these embodiments, the one or more ToF responders may be cheaper and easier to deploy than a full-scale AP.

In some demonstrative embodiments, mobile device 102 may communicate with the one or more wireless communication stations to perform the measurement procedure, and/or to perform a wireless association.

Figure 2:
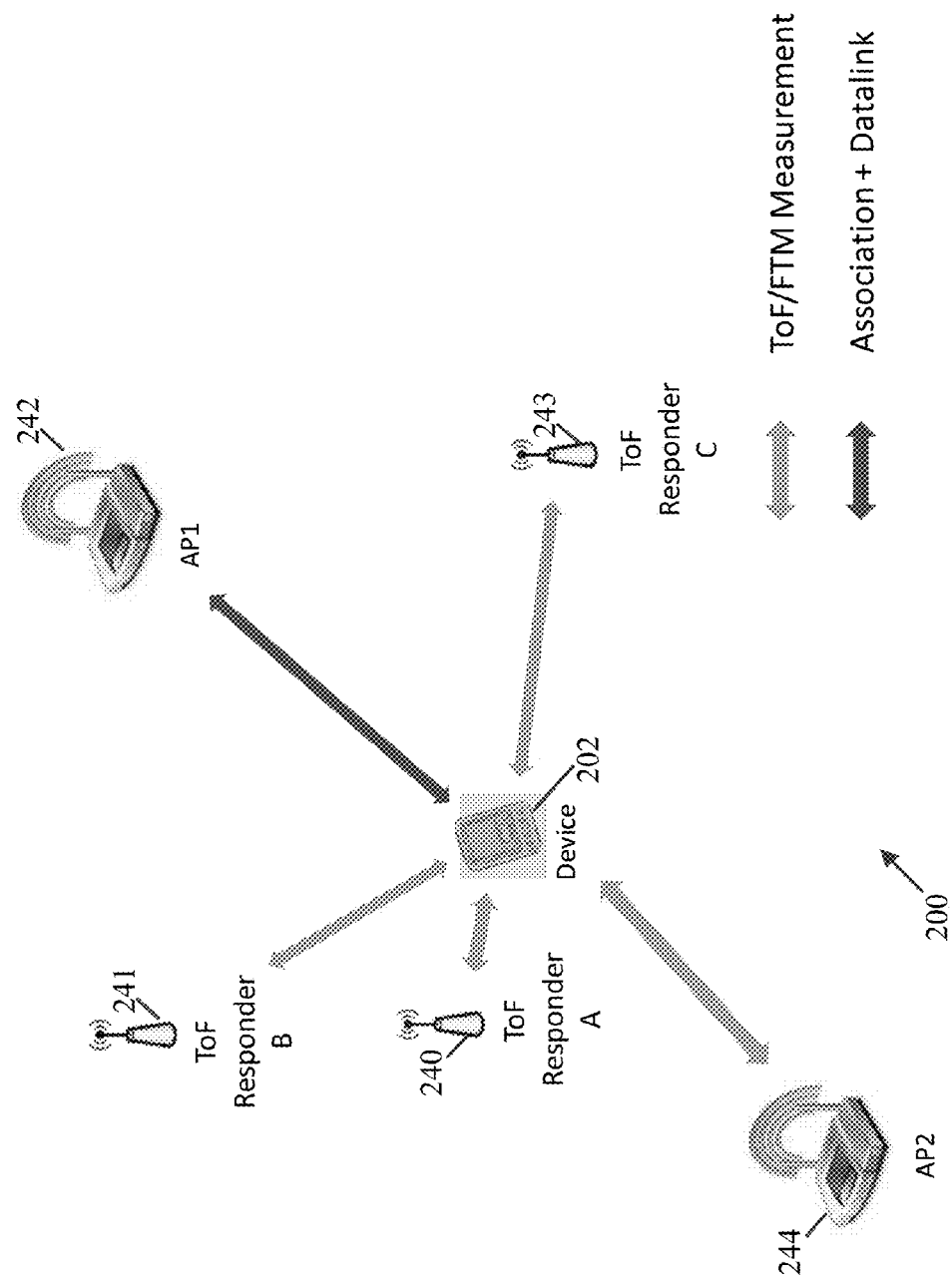
FIG. 2 is a schematic illustration of a mobile device communicating with a plurality of Time of Flight (ToF) responders and/or a plurality of Access Points (APs), in accordance with some demonstrative embodiments.

Reference is made to FIG. 2, which schematically illustrates a system 200 including a mobile device communicating with a plurality of ToF responders and/or a plurality of APs, in accordance with some demonstrative embodiments. For example, system 200 may perform the functionality of system 100.

As shown in FIG. 2, system 200 may include a device 202, and/or wireless communication stations 240, 241, 242, 243, and/or 244. For example, mobile device 102 (FIG. 1) may perform the functionality of device 202, and/or wireless communication station 140 (FIG. 1) may perform the functionality of a station of wireless communication stations 240, 241, 242, 243, and/or 244.

In some demonstrative embodiments, device 202 may detect one or more wireless communication stations, e.g., wireless communication stations 240, 241, 242, 243, and/or 244.

As shown in FIG. 2, wireless communication stations 242 and/or 244 may include an AP.

In some demonstrative embodiments, wireless communication stations 242 and/or 244 may be capable to provide information for the measurement procedure, and/or to perform wireless association, for example, if wireless communication stations 242 and/or 244 include an AP.

As shown in FIG. 2, wireless communication stations 240, 241, and/or 243 may include a ToF responder.

In some demonstrative embodiments, communication stations 240, 241, and/or 243 may be capable to provide information for the measurement procedure, and may not be capable to perform wireless association, for example, if wireless communication stations 240, 241, and/or 243 include a ToF responder.

In some demonstrative embodiments, device 202 may not be capable to determine whether or not the one or more wireless communication stations 240, 241, 242, 243, and/or 244 are capable to perform the wireless association, e.g., if no information is provided to device 202 regarding an association capability of wireless communication stations 240, 241, 242, 243, and/or 244.

In some demonstrative embodiments, device 202 may not be capable to differentiate between wireless communication stations 240, 241, and/or 243 including the ToF responder, and wireless communication stations 242 and/or 244 including the AP, e.g., if no information is provided to device 202 regarding the association capability of wireless communication stations 240, 241, 242, 243, and/or 244.

For example, device 202 may wrongly identify the ToF responder as the AP, e.g., based on a beacon frame, a probe response frame, and/or any other frame.

In some demonstrative embodiments, device 202 may establish a connection with one or more wireless communication stations 240, 241, 242, 243, and/or 244 to perform the measurement procedure, and/or the wireless association.

In some demonstrative embodiments, device 202 may attempt to associate with one or more of wireless communication stations 240, 241, 242, 243, and/or 244, for example, based on a Received Signal Strength Indication (RSSI), and/or any other parameter.

For example, wireless communication station 240 may be located relatively close to device 202, and may provide a relatively strong RSSI. According to this example, device 202 may attempt to associate with wireless communication station 240.

In some demonstrative embodiments, wireless communication station 240 may not be capable to perform the wireless association with device 202, for example, if wireless communication station 240 includes the ToF responder.

For example, wireless communication station 240 may be completely disconnected from a backhaul network, and may not be capable to perform the wireless association with device 202, for example, if wireless communication station 240 includes the ToF responder.

In some demonstrative embodiments, device 202 may fail to perform the wireless association with wireless communication station 240, for example, if wireless communication station 240 is not capable to perform the wireless association.

In some demonstrative embodiments, a failed association between device 202 and wireless communication station 240 may waste air interface resources, decrease a connectivity of device 202, and/or undermine a performance of one or more wireless communication stations, e.g., wireless communication stations 240, 241, 242, 243, and/or 244.

Referring back to FIG. 1, in some demonstrative embodiments wireless communication station 140 may be configured to indicate whether or not wireless communication station 140 is capable to perform the wireless association, e.g., as described below.

In some demonstrative embodiments, mobile device 102 may be configured to perform the wireless association with wireless communication station 140, for example, only if wireless communication station 140 indicates that wireless communication station 140 is capable to perform the wireless association, e.g., as described below.

In some demonstrative embodiments, wireless communication station 140 may generate a frame 131 including an association capability indication. For example, message processor 158 may generate frame 131, and radio 144 may transmit frame 131.

In some demonstrative embodiments, the association capability indication may indicate a capability of wireless communication station 140 to perform the wireless association.

In some demonstrative embodiments, the association capability indication may include a bit in a reserved field of frame 131, e.g., as described below with reference to FIG. 3.

In other demonstrative embodiments, the association capability indication may be included in any other field of frame 131.

In some demonstrative embodiments, message processor 158 may generate frame 131 indicating that wireless communication station 140 is not capable to perform the wireless association, for example, if wireless communication station 140 is not capable to perform the wireless association.

For example, frame 131 may indicate that wireless communication station 140 is not capable to perform the wireless association, for example, if wireless communication station 140 performs the functionality of a ToF responder.

In some demonstrative embodiments, message processor 158 may generate frame 131 indicating that wireless communication station 140 is capable to perform the wireless association, for example, if wireless communication station 140 is capable to perform the wireless association.

For example, frame 131 may indicate that wireless communication station 140 is capable to perform the wireless association, for example, if wireless communication station 140 performs the functionality of an AP.

In some demonstrative embodiments, frame 131 may include a beacon frame. For example, wireless communication station 140 may periodically transmit the beacon frame, e.g., to enable wireless communication devices to discover wireless communication station 140.

In other demonstrative embodiments, frame 131 may include a probe response frame. For example, wireless communication station 140 may transmit the probe response frame in response to a probe request frame, e.g., as described below.

In some demonstrative embodiments, mobile device 102 may receive frame 131 including the association capability indication. For example, radio 114 may receive frame 131 from wireless communication station 140.

In some demonstrative embodiments, mobile device 102 may receive frame 131 from wireless communication station 140 in response to the probe request frame, e.g., as described below.

In some demonstrative embodiments, mobile device 102 may generate and transmit a probe request frame 129. For example, message processor 128 may generate probe request frame 129, and radio 114 may send probe request frame 129 to wireless communication station 140.

In some demonstrative embodiments, wireless communication station 140 may receive probe request frame 129. For example, radio 144 may receive probe request frame 129 from mobile device 102.

In some demonstrative embodiments, wireless communication station 140 may generate a probe response frame. For example, message processor 158 may generate the probe response frame including the association capability indication.

For example, wireless communication station 140 may generate the probe response frame after receiving probe request frame 129.

In some demonstrative embodiments, wireless communication station 140 may transmit the probe response frame in response to probe request frame 129. For example, radio 144 may transmit the probe response frame to mobile device 102.

In some demonstrative embodiments, controller 124 may initiate an association procedure between mobile device 102 and wireless communication station 140 e.g., based on the association capability indication of wireless communication station 140.

In some demonstrative embodiments, controller 124 may initiate the association procedure between mobile device 102 and wireless communication station 140, for example, only if the association capability indication of wireless communication station 140 indicates that wireless communication station 140 is capable to perform the wireless association.

In some demonstrative embodiments, controller 124 may not initiate the association procedure between mobile device 102 and wireless communication station 140, for example, if the association capability indication of wireless communication station 140 indicates that wireless communication station 140 is not capable to perform the wireless association.

Figure 3:
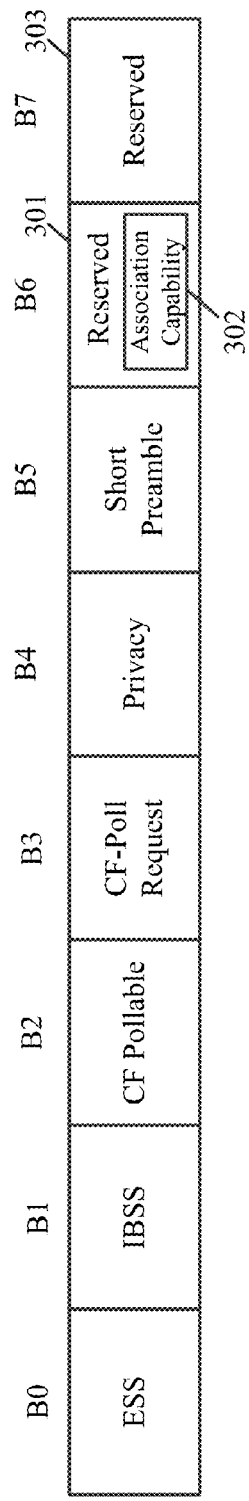
FIG. 3 is a schematic illustration of a capability information field, in accordance with some demonstrative embodiments.
Figure 3:
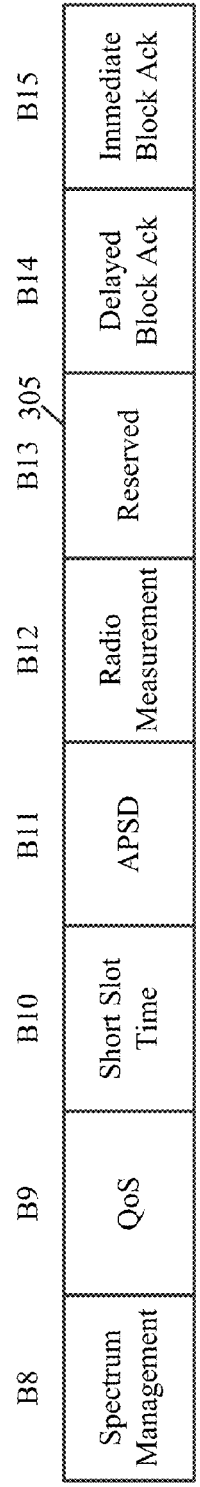

Reference is made to FIG. 3, which schematically illustrates a capability information field 300, in accordance with some demonstrative embodiments. For example, capability information field 300 may be included as part of frame 131 (FIG. 1), which may be transmitted by wireless communication station 140 (FIG. 1).

In one example, capability information field 300 may be part of a beacon frame. In another example, capability information field 300 may be part of a probe response frame.

In some demonstrative embodiments, capability information field 300 may include an association capability indication 302, which indicates whether or not wireless communication station 140 (FIG. 1) is capable to perform a wireless association.

In some demonstrative embodiments, association capability indication 302 may include a bit in a reserved field 301 of field 300.

In one example, association capability indication 302 may be located in reserved field 301, which may be located after a short preamble field, denoted B5.

In another example, association capability indication 302 may be in another reserved field 303, which may be located before a spectrum management field, denoted B8.

In another example, association capability indication 302 may be in another reserved field 305, which may be located after a radio measurement field denoted B12, and before a delayed block ack field, denoted B14.

In some demonstrative embodiments, association capability indication 302 may include a first predefined bit value indicating that wireless communication station 140 (FIG. 1) is capable to perform the wireless association, for example, if wireless communication station 140 (FIG. 1) is capable to perform the wireless association.

In other demonstrative embodiments, association capability indication 302 may include a second predefined bit value, different from the first predefined bit value, indicating that wireless communication station 140 (FIG. 1) is not capable to perform the wireless association, for example, if wireless communication station 140 (FIG. 1) is not capable to perform the wireless association.

Referring back to FIG. 1, in some demonstrative embodiments, wireless communication station 140 may transmit frame 131 to mobile device 102, for example, only if wireless communication station 140 is capable to perform the wireless association, e.g., as described below.

In some demonstrative embodiments, mobile device 102 may generate and transmit probe request frame 129 including an indication that only a wireless communication station capable to perform the wireless association is to respond to probe request frame 129, e.g., as described below with reference to FIG. 4.

In some demonstrative embodiments, wireless communication station 140 may receive from mobile device 102 probe request frame 129 including the indication that wireless communication station 140 is to respond to probe request frame 129 only if wireless communication station 140 is capable to perform the wireless association.

In some demonstrative embodiments, wireless communication station 140 may be configured to process probe request frame 129, and to select whether or not to respond to probe request frame 129, e.g., based on the association capability indication of wireless communication station 140.

In some demonstrative embodiments, wireless communication station 140 may transmit the probe response frame to mobile device 102, for example, only if wireless communication station 140 is capable to perform the wireless association.

In one example, wireless communication station 140 may include a device, e.g., an AP, capable to perform the wireless association. According to this example, wireless communication station 140 may transmit the probe response frame including the association capability indication indicating that wireless communication station 140 is capable to perform the wireless association.

In another example, wireless communication station 140 may include a device, e.g., a ToF responder, which is not capable to perform the wireless association. According to this example, wireless communication station 140 may select not to respond to probe request frame 129.

In some demonstrative embodiments, an advertised indication of the capability of wireless communication station 140 to perform the wireless association may improve a performance of mobile device 102 and/or wireless communication station 140.

For example, the advertised indication may save an airtime of mobile device 102, improve a network connectivity, and/or increase time in which wireless communication station 140 serves nearby wireless devices, e.g., mobile device 102.

Figure 4:
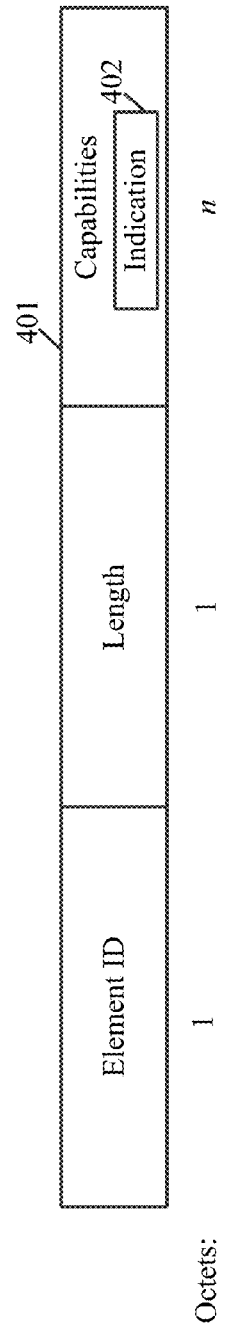
FIG. 4 is a schematic illustration of an extended capabilities element, in accordance with some demonstrative embodiments.

Reference is made to FIG. 4, which schematically illustrates an extended capabilities element 400, in accordance with some demonstrative embodiments. For example, extended capabilities element 400 may carry information about capabilities of mobile device 102 (FIG. 1).

In some demonstrative embodiments, extended capabilities element 400 may be part of probe request frame 129 (FIG. 1), which is transmitted by mobile device 102 (FIG. 1).

In some demonstrative embodiments, extended capabilities element 400 may include an indication 402, which indicates that only one or more wireless communication stations capable to perform a wireless association are to respond to probe request frame 129 (FIG. 1), e.g., as described above.

In some demonstrative embodiments, indication 402 may include a bit in a capabilities field 401. For example, capabilities field 401 may indicate the capabilities, which are advertised by mobile device 102 (FIG. 1).

For example, indication 402 may include a predefined bit value to indicate that only the one or more wireless communication stations capable to perform a wireless association are to respond to probe request frame 129 (FIG. 1).

Figure 5:
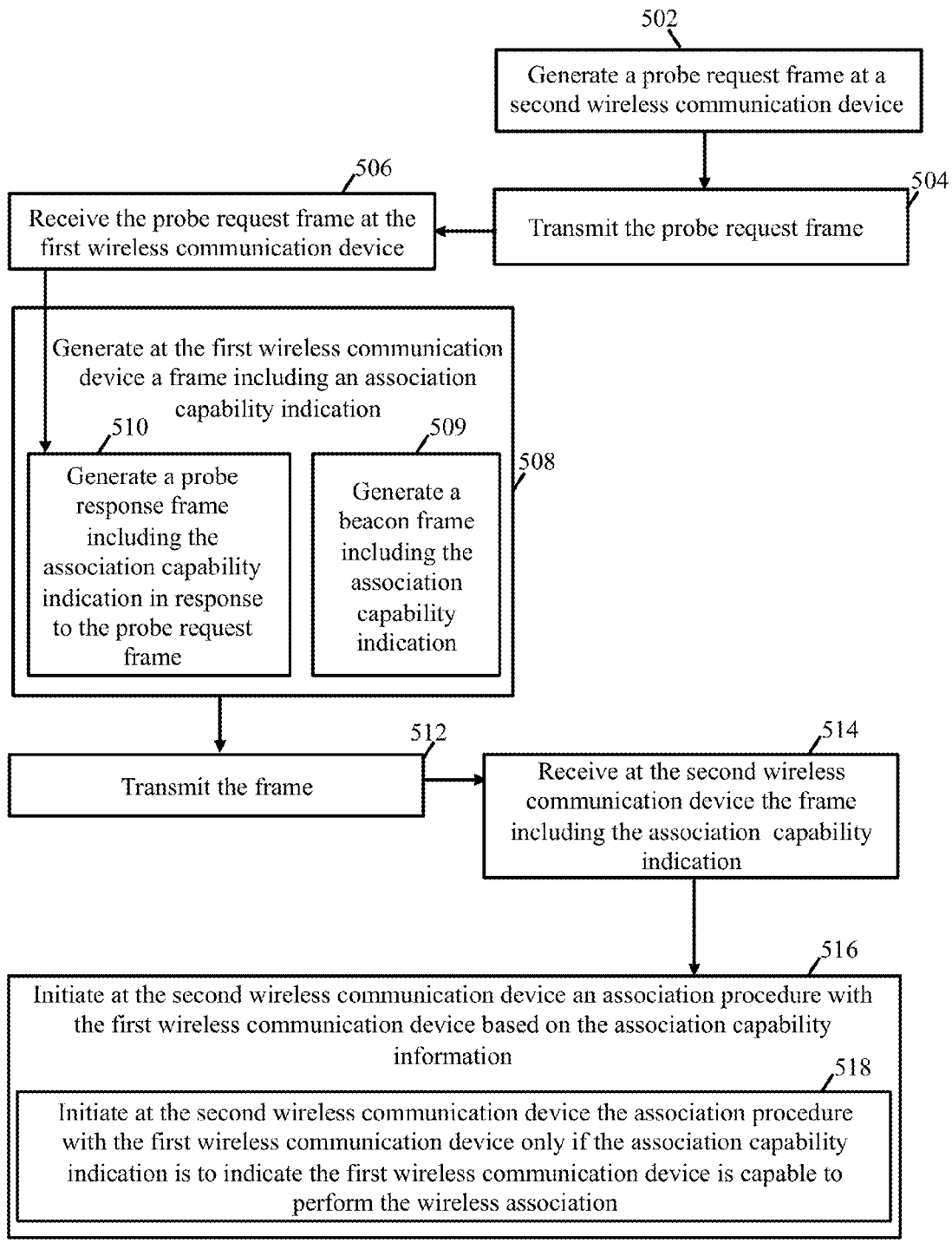
FIG. 5 is a schematic flow-chart illustration of a method of performing a wireless association, in accordance with some demonstrative embodiments.

Reference is made to FIG. 5, which schematically illustrates a flow chart of a method of performing a wireless association between a first wireless communication device and a second wireless communication device, in accordance with some demonstrative embodiments. For example, one or more of the operations of the method of FIG. 5 may be performed by a wireless communication system, e.g., system 100 (FIG. 1); a wireless communication device, e.g., mobile device 102 and/or wireless communication station 140 (FIG. 1); a controller, e.g., controllers 124 and/or 154 (FIG. 1); a radio, e.g., radios 114 and/or 144 (FIG. 1); a transmitter, e.g., transmitters 118 and/or 148 (FIG. 1); a receiver, e.g., receivers 116 and/or 146 (FIG. 1); and/or a message processor, e.g., message processors 128 and/or 158 (FIG. 1).

In some demonstrative embodiments, wireless communication station 140 (FIG. 1) may perform the functionality of the first wireless communication device, and/or mobile device 102 (FIG. 1) may perform the functionality of the second wireless communication device.

As indicated at block 508, the method may include generating at the first wireless communication device a frame including an association capability indication. For example, message processor 158 (FIG. 1) of wireless communication station 140 (FIG. 1) may generate frame 131 (FIG. 1) including the association capability indication, e.g., as described above.

In some demonstrative embodiments, the frame may include a beacon frame.

For example, as indicated at block 509, generating the frame may include generating a beacon frame including the association capability indication. For example, message processor 158 (FIG. 1) may generate the beacon frame including the association capability indication, e.g., as described above.

In other demonstrative embodiments, the frame may include a probe response frame.

For example, as indicated at block 510, generating the frame may include generating the probe response frame in response to a probe request frame. For example, message processor 158 (FIG. 1) may generate the probe response frame including the association capability indication, for example, in response to probe request frame 129 (FIG. 1), e.g., as described above.

In some demonstrative embodiments, as indicated at block 502, the method may include generating the probe request frame at the second wireless communication device. For example, message processor 128 (FIG. 1) of mobile device 102 (FIG. 1) may generate probe request frame 129 (FIG. 1), e.g., as described above.

As indicated at block 504, the method may include transmitting the probe request frame. For example, transmitter 118 (FIG. 1) of mobile device 102 (FIG. 1) may transmit probe request frame 129 (FIG. 1), e.g., as described above.

As indicated at block 506, the method may include receiving the probe request frame at the first wireless communication device. For example, receiver 146 (FIG. 1) of wireless communication station 140 (FIG. 1) may receive probe request frame 129 (FIG. 1), e.g., as described above.

As indicated at block 512, the method may include transmitting the frame from the first wireless communication device. For example, transmitter 148 (FIG. 1) may transmit frame 131 (FIG. 1), e.g., as described above.

As indicated at block 514, the method may include receiving the frame including the association capability indication at the second wireless communication device. For example, receiver 116 (FIG. 1) of mobile device 102 (FIG. 1) may receive from wireless communication station 140 (FIG. 1) frame 131 (FIG. 1) including the association capability indication, e.g., as described above.

As indicated at block 516, the method may include initiating at the second wireless communication device an association procedure with the first wireless communication device, for example, based on the association capability information of the first wireless communication device. For example, controller 124 (FIG. 1) of mobile device 102 (FIG. 1) may initiate the association procedure with wireless communication station 140 (FIG. 1), for example, based on the capability information, e.g., as described above.

In some demonstrative embodiments, as indicated at block 518, initiating the association procedure may include initiating at the second wireless communication device the association procedure with the wireless communication station, for example, only if the association capability indication indicates that the wireless communication station is capable to perform the wireless association. For example, controller 124 (FIG. 1) may initiate the association procedure with wireless communication station 140 (FIG. 1), for example, only if the association capability indication indicates that wireless communication station 140 (FIG. 1) is capable to perform the wireless association, e.g., as described above.

Figure 6:
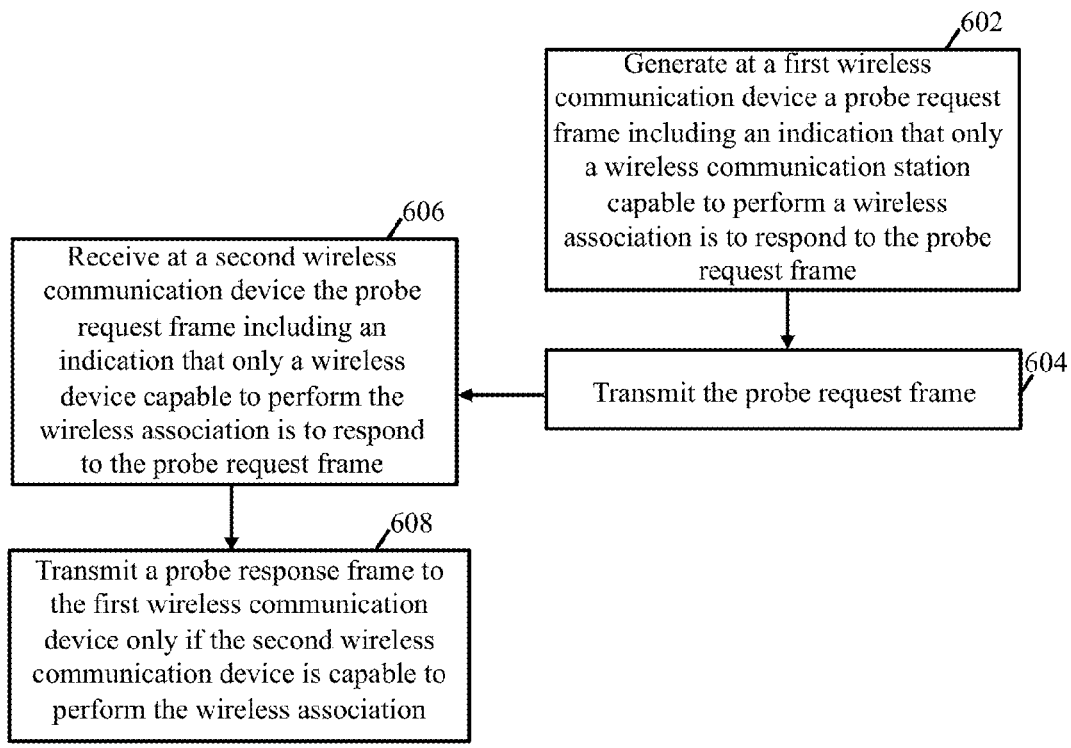
FIG. 6 is a schematic flow-chart illustration of a method of communicating probe request and probe response frames, in accordance with some demonstrative embodiments.

Reference is made to FIG. 6, which schematically illustrates a flow chart of a method of communicating probe request and probe response frames between a first wireless communication device and a second communication device, in accordance with some demonstrative embodiments. For example, one or more of the operations of the method of FIG. 6 may be performed by a wireless communication system, e.g., system 100 (FIG. 1); a wireless communication device, e.g., mobile device 102 and/or wireless communication station 140 (FIG. 1); a controller, e.g., controllers 124 and/or 154 (FIG. 1); a radio, e.g., radios 114 and/or 144 (FIG. 1); a transmitter, e.g., transmitters 118 and/or 148 (FIG. 1); a receiver, e.g., receivers 116 and/or 146 (FIG. 1); and/or a message processor, e.g., message processors 128 and/or 158 (FIG. 1).

In some demonstrative embodiments, mobile device 102 (FIG. 1) may perform the functionality of the first wireless communication device, and/or wireless communication station 140 (FIG. 1) may perform the functionality of the second wireless communication device.

In some demonstrative embodiments, as indicated at block 602, the method may include generating at the first wireless communicating device a probe request frame including an indication that only a wireless communication station capable to perform wireless association is to respond to the probe request frame. For example, message processor 128 (FIG. 1) of mobile device 102 (FIG. 1) may generate probe request frame 129 (FIG. 1) including the indication that only a wireless communication station capable to perform wireless association is to respond to probe request frame 129 (FIG. 1), e.g., as described above.

As indicated at block 604, the method may include transmitting the probe request frame from the first wireless communication device. For example, transmitter 118 (FIG. 1) of mobile device 102 (FIG. 1) may transmit probe request frame 129 (FIG. 1), e.g., as described above.

In some demonstrative embodiments, as indicated at block 606, the method may include receiving at the second wireless communication device the probe request frame including the indication that only a wireless device capable to perform wireless association is to respond to the probe request frame. For example, receiver 146 (FIG. 1) of wireless communication station 140 (FIG. 1) may receive probe request frame 129 (FIG. 1) including the indication that only a wireless device capable to perform the wireless association is to respond to probe request frame 129 (FIG. 1), e.g., as described above.

As indicated at block 608, the method may include transmitting a probe response frame to the first wireless communication device, for example, only if the second communication device is capable to perform the wireless association. For example, transmitter 148 (FIG. 1) of wireless communication station 140 (FIG. 1) may transmit the probe response frame to mobile device 102 (FIG. 1), for example, only if wireless communication station 140 (FIG. 1) is capable to perform the wireless association, e.g., as described above.

Figure 7:
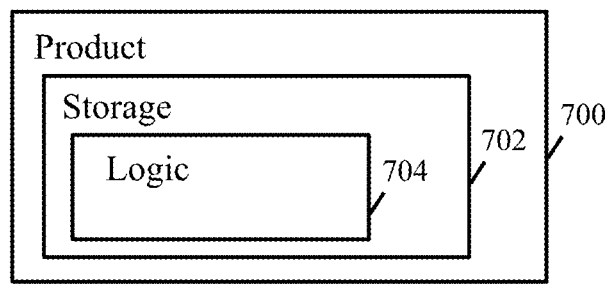
FIG. 7 is a schematic illustration of a product, in accordance with some demonstrative embodiments.

Reference is made to FIG. 7, which schematically illustrates a product of manufacture 700, in accordance with some demonstrative embodiments. Product 700 may include a non-transitory machine-readable storage medium 702 to store logic 704, which may be used, for example, to perform at least part of the functionality of mobile device 102 and/or wireless communication station 140 (FIG. 1), radios 114 and/or 144 (FIG. 1), transmitters 118 and/or 148 (FIG. 1), receivers 116 and/or 146 (FIG. 1), controllers 124 and/or 154 (FIG. 1), message processors 128 and/or 158 (FIG. 1) and/or to perform one or more operations of the methods of FIG. 5 and/or FIG. 6. The phrase "non-transitory machine-readable medium" is directed to include all computer-readable media, with the sole exception being a transitory propagating signal.

In some demonstrative embodiments, product 700 and/or machine-readable storage medium 702 may include one or more types of computer-readable storage media capable of storing data, including volatile memory, non-volatile memory, removable or non-removable memory, erasable or non-erasable memory, writeable or re-writeable memory, and the like. For example, machine-readable storage medium 702 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 704 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 704 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

EXAMPLES

The following examples pertain to further embodiments.

Example 1 includes a mobile device comprising a radio to receive from a wireless communication station a frame including an association capability indication, the association capability indication to indicate a capability of the wireless communication station to perform a wireless association; and a controller to initiate an association procedure with the wireless communication station based on the capability information.

Example 2 includes the subject matter of Example 1, and optionally, wherein the controller is to initiate the association procedure with the wireless communication station only if the association capability indication is to indicate the wireless communication station is capable to perform the wireless association.

Example 3 includes the subject matter of Example 1 or 2, and optionally, wherein the association capability indication comprises a bit in a reserved field of the frame.

Example 4 includes the subject matter of any one of Examples 1-3, and optionally, wherein the frame comprises a beacon frame.

Example 5 includes the subject matter of any one of Examples 1-3, and optionally, wherein the frame comprises a probe response frame.

Example 6 includes the subject matter of Example 5, and optionally, wherein the radio is to send a probe request frame to the wireless communication station, and to receive the probe response frame in response to the probe request frame.

Example 7 includes the subject matter of any one of Examples 1-6, and optionally, wherein the radio is to perform a Time of Flight (ToF) measurement procedure with the wireless communication station.

Example 8 includes the subject matter of any one of Examples 1-7, and optionally, comprising one or more antennas, a processor, and a memory.

Example 9 includes a wireless communication station comprising a message processor to generate a frame including an association capability indication, the association capability indication to indicate whether or not the wireless communication station is capable to perform a wireless association; and a radio to transmit the frame.

Example 10 includes the subject matter of Example 9, and optionally, wherein the association capability indication comprises a bit in a reserved field of the frame.

Example 11 includes the subject matter of Example 9 or 10, and optionally, wherein the frame comprises a beacon frame.

Example 12 includes the subject matter of Example 9 or 10, and optionally, wherein the frame comprises a probe response frame.

Example 13 includes the subject matter of Example 12, and optionally, wherein the radio is to receive a probe request frame, and to transmit the probe response frame in response to the probe request frame.

Example 14 includes the subject matter of any one of Examples 9-13, and optionally, comprising an Access Point (AP).

Example 15 includes the subject matter of Example 14, and optionally, wherein the message processor is to generate the frame including the association capability indication to indicate the wireless communication station is capable to perform the wireless association.

Example 16 includes the subject matter of any one of Examples 9-13, and optionally, comprising a Time of Flight (ToF) responder.

Example 17 includes the subject matter of Example 16, and optionally, wherein the message processor is to generate the frame including the association capability indication to indicate the wireless communication station is not capable to perform the wireless association.

Example 18 includes the subject matter of any one of Examples 9-17, and optionally, comprising one or more antennas, a processor, and a memory.

Example 19 includes a mobile device comprising a message processor to generate a probe request frame including an indication that only a wireless communication station capable to perform a wireless association is to respond to the probe request frame; and a radio to transmit the probe request frame.

Example 20 includes the subject matter of Example 19, and optionally, wherein the radio is to receive from a wireless device a probe response frame in response to the probe request frame, the probe response frame including an association capability indication to indicate that the wireless device is capable to perform the wireless association.

Example 21 includes the subject matter of Example 20, and optionally, wherein the radio is to associate with the wireless device based on the probe response frame.

Example 22 includes the subject matter of any one of Examples 19-21, and optionally, wherein the indication comprises a bit in an extended capabilities information element of the probe request frame.

Example 23 includes the subject matter of any one of Examples 19-22, and optionally, comprising one or more antennas, a processor, and a memory.

Example 24 includes a wireless communication station comprising a receiver to receive from a mobile device a probe request frame including an indication that only a wireless device capable to perform a wireless association is to respond to the probe request frame; and a transmitter to transmit a probe response frame to the mobile device if the wireless communication station is capable to perform the wireless association.

Example 25 includes the subject matter of Example 24, and optionally, wherein the indication comprises a bit in an extended capabilities information element of the probe request frame.

Example 26 includes the subject matter of Example 24 or 25, and optionally, wherein the transmitter is to transmit the probe response frame including an association capability indication to indicate that the wireless communication station is capable to perform the wireless association.

Example 27 includes the subject matter of any one of Examples 24-26, and optionally, comprising an Access Point (AP).

Example 28 includes the subject matter of Example 24 or 25, and optionally, comprising a Time of Flight (ToF) responder, which is not capable to perform the wireless association, the TOF responder being configured to process the probe request frame and to select not to respond to the probe request frame.

Example 29 includes the subject matter of any one of Examples 23-28, and optionally, comprising one or more antennas, a processor, and a memory.

Example 30 includes a system of wireless communication comprising a mobile device, the mobile device comprising one or more antennas; a processor; a memory; a radio to receive from a wireless communication station a frame including an association capability indication, the association capability indication to indicate a capability of the wireless communication station to perform a wireless association; and a controller to initiate an association procedure with the wireless communication station based on the capability information.

Example 31 includes the subject matter of Example 30, and optionally, wherein the controller is to initiate the association procedure with the wireless communication station only if the association capability indication is to indicate the wireless communication station is capable to perform the wireless association.

Example 32 includes the subject matter of Example 30 or 31, and optionally, wherein the association capability indication comprises a bit in a reserved field of the frame.

Example 33 includes the subject matter of any one of Examples 30-32, and optionally, wherein the frame comprises a beacon frame.

Example 34 includes the subject matter of any one of Examples 30-32, and optionally, wherein the frame comprises a probe response frame.

Example 35 includes the subject matter of Example 34, and optionally, wherein the radio is to send a probe request frame to the wireless communication station, and to receive the probe response frame in response to the probe request frame.

Example 36 includes the subject matter of any one of Examples 30-35, and optionally, wherein the radio is to perform a Time of Flight (ToF) measurement procedure with the wireless communication station.

Example 37 includes a system of wireless communication comprising a wireless communication station, the wireless communication station comprising one or more antennas; a processor; a memory; a message processor to generate a frame including an association capability indication, the association capability indication to indicate whether or not the wireless communication station is capable to perform a wireless association; and a radio to transmit the frame.

Example 38 includes the subject matter of Example 37, and optionally, wherein the association capability indication comprises a bit in a reserved field of the frame.

Example 39 includes the subject matter of Example 37 or 38, and optionally, wherein the frame comprises a beacon frame.

Example 40 includes the subject matter of Example 37 or 38, and optionally, wherein the frame comprises a probe response frame.

Example 41 includes the subject matter of Example 40, and optionally, wherein the radio is to receive a probe request frame, and to transmit the probe response frame in response to the probe request frame.

Example 42 includes the subject matter of any one of Examples 37-41, and optionally, wherein the wireless communication station comprises an Access Point (AP).

Example 43 includes the subject matter of Example 42, and optionally, wherein the message processor is to generate the frame including the association capability indication to indicate the wireless communication station is capable to perform the wireless association.

Example 44 includes the subject matter of any one of Examples 37-41, and optionally, wherein the wireless communication station comprises a Time of Flight (ToF) responder.

Example 45 includes the subject matter of Example 44, and optionally, wherein the message processor is to generate the frame including the association capability indication to indicate the wireless communication station is not capable to perform the wireless association.

Example 46 includes a system of wireless communication comprising a mobile device, the mobile device comprising one or more antennas; a processor; a memory; a message processor to generate a probe request frame including an indication that only a wireless communication station capable to perform a wireless association is to respond to the probe request frame; and a radio to transmit the probe request frame.

Example 47 includes the subject matter of Example 46, and optionally, wherein the radio is to receive from a wireless device a probe response frame in response to the probe request frame, the probe response frame including an association capability indication to indicate that the wireless device is capable to perform the wireless association.

Example 48 includes the subject matter of Example 47, and optionally, wherein the radio is to associate with the wireless device based on the probe response frame.

Example 49 includes the subject matter of any one of Examples 46-48, and optionally, wherein the indication comprises a bit in an extended capabilities information element of the probe request frame.

Example 50 includes a system of wireless communication comprising a wireless communication station, the wireless communication station comprising one or more antennas; a processor; a memory; a receiver to receive from a mobile device a probe request frame including an indication that only a wireless device capable to perform a wireless association is to respond to the probe request frame; and a transmitter to transmit a probe response frame to the mobile device if the wireless communication station is capable to perform the wireless association.

Example 51 includes the subject matter of Example 50, and optionally, wherein the indication comprises a bit in an extended capabilities information element of the probe request frame.

Example 52 includes the subject matter of Example 50 or 51, and optionally, wherein the transmitter is to transmit the probe response frame including an association capability indication to indicate that the wireless communication station is capable to perform the wireless association.

Example 53 includes the subject matter of any one of Examples 50-52, and optionally, wherein the wireless communication station comprises an Access Point (AP).

Example 54 includes the subject matter of Example 50 or 51, and optionally, wherein the wireless communication station comprises a Time of Flight (ToF) responder, which is not capable to perform the wireless association, the TOF responder being configured to process the probe request frame and to select not to respond to the probe request frame.

Example 55 includes a method to be performed by a mobile device, the method comprising receiving from a wireless communication station a frame including an association capability indication, the association capability indication to indicate a capability of the wireless communication station to perform a wireless association; and initiating an association procedure with the wireless communication station based on the capability information.

Example 56 includes the subject matter of Example 55, and optionally, comprising initiating the association procedure with the wireless communication station only if the association capability indication is to indicate the wireless communication station is capable to perform the wireless association.

Example 57 includes the subject matter of Example 55 or 56, and optionally, wherein the association capability indication comprises a bit in a reserved field of the frame.

Example 58 includes the subject matter of any one of Examples 55-57, and optionally, wherein the frame comprises a beacon frame.

Example 59 includes the subject matter of any one of Examples 55-57, and optionally, wherein the frame comprises a probe response frame.

Example 60 includes the subject matter of Example 59, and optionally, comprising sending a probe request frame to the wireless communication station, and receiving the probe response frame in response to the probe request frame.

Example 61 includes the subject matter of any one of Examples 55-60, and optionally, comprising performing a Time of Flight (ToF) measurement procedure with the wireless communication station.

Example 62 includes a method to be performed by a wireless communication station, the method comprising generating a frame including an association capability indication, the association capability indication to indicate whether or not the wireless communication station is capable to perform a wireless association; and transmitting the frame.

Example 63 includes the subject matter of Example 62, and optionally, wherein the association capability indication comprises a bit in a reserved field of the frame.

Example 64 includes the subject matter of Example 62 or 63, and optionally, wherein the frame comprises a beacon frame.

Example 65 includes the subject matter of Example 62 or 63, and optionally, wherein the frame comprises a probe response frame.

Example 66 includes the subject matter of Example 65, and optionally, comprising receiving a probe request frame, and transmitting the probe response frame in response to the probe request frame.

Example 67 includes the subject matter of any one of Examples 62-66, and optionally, wherein the wireless communication station comprises an Access Point (AP).

Example 68 includes the subject matter of Example 67, and optionally, comprising generating the frame including the association capability indication to indicate the wireless communication station is capable to perform the wireless association.

Example 69 includes the subject matter of any one of Examples 62-66, and optionally, wherein the wireless communication station comprises a Time of Flight (ToF) responder.

Example 70 includes the subject matter of Example 69, and optionally, comprising generating the frame including the association capability indication to indicate the wireless communication station is not capable to perform the wireless association.

Example 71 includes a method to be performed by a mobile device, the method comprising generating a probe request frame including an indication that only a wireless communication station capable to perform a wireless association is to respond to the probe request frame; and transmitting the probe request frame.

Example 72 includes the subject matter of Example 71, and optionally, comprising receiving from a wireless device a probe response frame in response to the probe request frame, the probe response frame including an association capability indication to indicate that the wireless device is capable to perform the wireless association.

Example 73 includes the subject matter of Example 72, and optionally, comprising associating with the wireless device based on the probe response frame.

Example 74 includes the subject matter of any one of Examples 71-73, and optionally, wherein the indication comprises a bit in an extended capabilities information element of the probe request frame.

Example 75 includes a method to be performed by a wireless communication station, the method comprising receiving from a mobile device a probe request frame including an indication that only a wireless device capable to perform a wireless association is to respond to the probe request frame; and transmitting a probe response frame to the mobile device if the wireless communication station is capable to perform the wireless association.

Example 76 includes the subject matter of Example 75, and optionally, wherein the indication comprises a bit in an extended capabilities information element of the probe request frame.

Example 77 includes the subject matter of Example 75 or 76, and optionally, comprising transmitting the probe response frame including an association capability indication to indicate that the wireless communication station is capable to perform the wireless association.

Example 78 includes the subject matter of any one of Examples 75-77, and optionally, wherein the wireless communication station comprises an Access Point (AP).

Example 79 includes the subject matter of Example 75 or 76, and optionally, wherein the wireless communication station comprises a Time of Flight (ToF) responder, which is not capable to perform the wireless association, the method comprising processing the probe request frame and selecting not to respond to the probe request frame.

Example 80 includes a product including one or more tangible computer-readable non-transitory storage media comprising computer-executable instructions operable to, when executed by at least one computer processor, enable the at least one computer processor to implement a method at a mobile device, the method comprising receiving from a wireless communication station a frame including an association capability indication, the association capability indication to indicate a capability of the wireless communication station to perform a wireless association; and initiating an association procedure with the wireless communication station based on the capability information.

Example 81 includes the subject matter of Example 80, and optionally, wherein the method comprises initiating the association procedure with the wireless communication station only if the association capability indication is to indicate the wireless communication station is capable to perform the wireless association.

Example 82 includes the subject matter of Example 80 or 81, and optionally, wherein the association capability indication comprises a bit in a reserved field of the frame.

Example 83 includes the subject matter of any one of Examples 80-82, and optionally, wherein the frame comprises a beacon frame.

Example 84 includes the subject matter of any one of Examples 80-82, and optionally, wherein the frame comprises a probe response frame.

Example 85 includes the subject matter of Example 84, and optionally, wherein the method comprises sending a probe request frame to the wireless communication station, and receiving the probe response frame in response to the probe request frame.

Example 86 includes the subject matter of any one of Examples 80-85, and optionally, wherein the method comprises performing a Time of Flight (ToF) measurement procedure with the wireless communication station.

Example 87 includes a product including one or more tangible computer-readable non-transitory storage media comprising computer-executable instructions operable to, when executed by at least one computer processor, enable the at least one computer processor to implement a method at a wireless communication station, the method comprising generating a frame including an association capability indication, the association capability indication to indicate whether or not the wireless communication station is capable to perform a wireless association; and transmitting the frame.

Example 88 includes the subject matter of Example 87, and optionally, wherein the association capability indication comprises a bit in a reserved field of the frame.

Example 89 includes the subject matter of Example 87 or 88, and optionally, wherein the frame comprises a beacon frame.

Example 90 includes the subject matter of Example 87 or 88, and optionally, wherein the frame comprises a probe response frame.

Example 91 includes the subject matter of Example 90, and optionally, wherein the method comprises receiving a probe request frame, and transmitting the probe response frame in response to the probe request frame.

Example 92 includes the subject matter of any one of Examples 87-91, and optionally, wherein the wireless communication station comprises an Access Point (AP).

Example 93 includes the subject matter of Example 92, and optionally, wherein the method comprises generating the frame including the association capability indication to indicate the wireless communication station is capable to perform the wireless association.

Example 94 includes the subject matter of any one of Examples 87-91, and optionally, wherein the wireless communication station comprises a Time of Flight (ToF) responder.

Example 95 includes the subject matter of Example 94, and optionally, wherein the method comprises generating the frame including the association capability indication to indicate the wireless communication station is not capable to perform the wireless association.

Example 96 includes a product including one or more tangible computer-readable non-transitory storage media comprising computer-executable instructions operable to, when executed by at least one computer processor, enable the at least one computer processor to implement a method at a mobile device, the method comprising generating a probe request frame including an indication that only a wireless communication station capable to perform a wireless association is to respond to the probe request frame; and transmitting the probe request frame.

Example 97 includes the subject matter of Example 96, and optionally, wherein the method comprises receiving from a wireless device a probe response frame in response to the probe request frame, the probe response frame including an association capability indication to indicate that the wireless device is capable to perform the wireless association.

Example 98 includes the subject matter of Example 97, and optionally, wherein the method comprises associating with the wireless device based on the probe response frame.

Example 99 includes the subject matter of any one of Examples 96-98, and optionally, wherein the indication comprises a bit in an extended capabilities information element of the probe request frame.

Example 100 includes a product including one or more tangible computer-readable non-transitory storage media comprising computer-executable instructions operable to, when executed by at least one computer processor, enable the at least one computer processor to implement a method at a wireless communication station, the method comprising receiving from a mobile device a probe request frame including an indication that only a wireless device capable to perform a wireless association is to respond to the probe request frame; and transmitting a probe response frame to the mobile device if the wireless communication station is capable to perform the wireless association.

Example 101 includes the subject matter of Example 100, and optionally, wherein the indication comprises a bit in an extended capabilities information element of the probe request frame.

Example 102 includes the subject matter of Example 100 or 101, and optionally, wherein the method comprises transmitting the probe response frame including an association capability indication to indicate that the wireless communication station is capable to perform the wireless association.

Example 103 includes the subject matter of any one of Examples 100-102, and optionally, wherein the wireless communication station comprises an Access Point (AP).

Example 104 includes the subject matter of Example 100 or 101, and optionally, wherein the wireless communication station comprises a Time of Flight (ToF) responder, which is not capable to perform the wireless association, the product, wherein the method comprises processing the probe request frame and selecting not to respond to the probe request frame.

Example 105 includes an apparatus of wireless communication, the apparatus comprising means for receiving at a mobile device from a wireless communication station a frame including an association capability indication, the association capability indication to indicate a capability of the wireless communication station to perform a wireless association; and means for initiating an association procedure with the wireless communication station based on the capability information.

Example 106 includes the subject matter of Example 105, and optionally, comprising means for initiating the association procedure with the wireless communication station only if the association capability indication is to indicate the wireless communication station is capable to perform the wireless association.

Example 107 includes the subject matter of Example 105 or 106, and optionally, wherein the association capability indication comprises a bit in a reserved field of the frame.

Example 108 includes the subject matter of any one of Examples 105-107, and optionally, wherein the frame comprises a beacon frame.

Example 109 includes the subject matter of any one of Examples 105-107, and optionally, wherein the frame comprises a probe response frame.

Example 110 includes the subject matter of Example 109, and optionally, comprising means for sending a probe request frame to the wireless communication station, and means for receiving the probe response frame in response to the probe request frame.

Example 111 includes the subject matter of any one of Examples 105-110, and optionally, comprising means for performing a Time of Flight (ToF) measurement procedure with the wireless communication station.

Example 112 includes an apparatus of wireless communication, the apparatus comprising means for generating at a wireless communication station a frame including an association capability indication, the association capability indication to indicate whether or not the wireless communication station is capable to perform a wireless association; and means for transmitting the frame.

Example 113 includes the subject matter of Example 112, and optionally, wherein the association capability indication comprises a bit in a reserved field of the frame.

Example 114 includes the subject matter of Example 112 or 113, and optionally, wherein the frame comprises a beacon frame.

Example 115 includes the subject matter of Example 112 or 113, and optionally, wherein the frame comprises a probe response frame.

Example 116 includes the subject matter of Example 115, and optionally, comprising means for receiving a probe request frame, and means for transmitting the probe response frame in response to the probe request frame.

Example 117 includes the subject matter of any one of Examples 112-116, and optionally, wherein the wireless communication station comprises an Access Point (AP).

Example 118 includes the subject matter of Example 117, and optionally, comprising means for generating the frame including the association capability indication to indicate the wireless communication station is capable to perform the wireless association.

Example 119 includes the subject matter of any one of Examples 112-116, and optionally, wherein the wireless communication station comprises a Time of Flight (ToF) responder.

Example 120 includes the subject matter of Example 119, and optionally, comprising means for generating the frame including the association capability indication to indicate the wireless communication station is not capable to perform the wireless association.

Example 121 includes an apparatus of wireless communication, the apparatus comprising means for generating at a mobile device a probe request frame including an indication that only a wireless communication station capable to perform a wireless association is to respond to the probe request frame; and means for transmitting the probe request frame.

Example 122 includes the subject matter of Example 121, and optionally, comprising means for receiving from a wireless device a probe response frame in response to the probe request frame, the probe response frame including an association capability indication to indicate that the wireless device is capable to perform the wireless association.

Example 123 includes the subject matter of Example 122, and optionally, comprising means for associating with the wireless device based on the probe response frame.

Example 124 includes the subject matter of any one of Examples 121-123, and optionally, wherein the indication comprises a bit in an extended capabilities information element of the probe request frame.

Example 125 includes an apparatus of wireless communication, the apparatus comprising means for receiving at a wireless communication station from a mobile device a probe request frame including an indication that only a wireless device capable to perform a wireless association is to respond to the probe request frame; and means for transmitting a probe response frame to the mobile device if the wireless communication station is capable to perform the wireless association.

Example 126 includes the subject matter of Example 125, and optionally, wherein the indication comprises a bit in an extended capabilities information element of the probe request frame.

Example 127 includes the subject matter of Example 125 or 126, and optionally, comprising means for transmitting the probe response frame including an association capability indication to indicate that the wireless communication station is capable to perform the wireless association.

Example 128 includes the subject matter of any one of Examples 125-127, and optionally, wherein the wireless communication station comprises an Access Point (AP).

Example 129 includes the subject matter of Example 125 or 126, and optionally, wherein the wireless communication station comprises a Time of Flight (ToF) responder, which is not capable to perform the wireless association, the apparatus comprising means for processing the probe request frame and selecting not to respond to the probe request frame.

Functions, operations, components and/or features described herein with reference to one or more embodiments, may be combined with, or may be utilized in combination with, one or more other functions, operations, components and/or features described herein with reference to one or more other embodiments, or vice versa.

While certain features of have been illustrated and described herein, many modifications, substitutions, changes, and equivalents may occur to those skilled in the art. It is, therefore, to be understood that the appended claims are intended to cover all such modifications and changes as fall within the true spirit of the disclosure.

What is claimed is:

1. A mobile device comprising:
a radio to receive from a wireless communication station a frame including an association capability indication, said association capability indication to indicate a capability of said wireless communication station to perform a wireless association, said association capability indication comprises an association capability bit in a field of said frame, the association capability indication comprising a first indication value when the wireless communication station comprises a Time of Flight (ToF) responder to perform a ToF measurement procedure without capability of performing the wireless association, the association capability indication comprising a second indication value when the wireless communication station comprises an Access Point (AP) with capability to perform the wireless association; and
a controller to select whether to initiate an association procedure with said wireless communication station based on whether said association capability indication comprises the first indication value or the second indication value,
said controller is to initiate said association procedure with said wireless communication station only if the association capability indication is to indicate said wireless communication station is capable to perform said wireless association.

2. The mobile device of claim 1, wherein said association capability bit comprises a bit in a reserved field of said frame.

3. The mobile device of claim 1, wherein said frame comprises a beacon frame.

4. The mobile device of claim 1, wherein said frame comprises a probe response frame.

5. The mobile device of claim 4, wherein said radio is to send a probe request frame to said wireless communication station, and to receive said probe response frame in response to said probe request frame.

6. The mobile device of claim 1, wherein said radio is to perform the ToF measurement procedure with said wireless communication station.

7. The mobile device of claim 1 comprising one or more antennas, a processor, and a memory.

8. A wireless communication station comprising:
a message processor to generate a frame including an association capability indication, said association capability indication to indicate whether or not said wireless communication station is capable to perform a wireless association, the association capability indication to indicate that an association procedure with said wireless communication station is to be initiated only if the association capability indication is to indicate said wireless communication station is capable to perform said wireless association, said association capability indication comprises an association capability bit in a field of said frame, the message processor configured to select to set the association capability indication to a first indication value if the wireless communication station comprises a Time of Flight (ToF) responder to perform a ToF measurement procedure without capability of performing the wireless association, the message processor configured to set the association capability indication to a second indication value if the wireless communication station comprises an Access Point (AP) with capability to perform the wireless association;
a radio to transmit said frame; and
a controller to perform the ToF measurement procedure with a mobile device.

9. The wireless communication station of claim 8, wherein said association capability bit comprises a bit in a reserved field of said frame.

10. The wireless communication station of claim 8, wherein said frame comprises a beacon frame.

11. The wireless communication station of claim 8, wherein said frame comprises a probe response frame.

12. The wireless communication station of claim 11, wherein said radio is to receive a probe request frame, and to transmit said probe response frame in response to said probe request frame.

13. The wireless communication station of claim 8 comprising the Access Point.

14. The wireless communication station of claim 13, wherein said message processor is to generate said frame including said association capability indication to indicate said wireless communication station is capable to perform said wireless association.

15. The wireless communication station of claim 8 comprising the ToF responder.

16. The wireless communication station of claim 15, wherein said message processor is to generate said frame including said association capability indication to indicate said wireless communication station is not capable to perform said wireless association.

17. The wireless communication station of claim 8 comprising one or more antennas, a processor, and a memory.

18. A product including one or more tangible computer-readable non-transitory storage media comprising computer-executable instructions operable to, when executed by at least one processor, enable the at least one processor to cause a mobile device to:
generate a probe request frame including an indication that a wireless communication station receiving the probe request frame is to respond to said probe request frame only when the wireless communication station comprises an Access Point (AP) capable to perform a wireless association, and that the wireless communication station is not to respond to said probe request frame when the wireless communication station comprises a Time of Flight (ToF) responder to perform a ToF measurement procedure without capability of performing the wireless association, said indication comprises a bit in an extended capabilities information element of said probe request frame;
transmit said probe request frame; and
based on receipt of a probe response frame from the wireless communication station, select whether to initiate an association procedure with said wireless communication station, said probe response frame including an association capability indication to indicate that said wireless communication station is capable to perform said wireless association.

19. The product of claim 18, wherein said association capability indication comprises an association capability bit in a field of said probe response frame.

20. A product including one or more tangible computer-readable non-transitory storage media comprising computer-executable instructions operable to, when executed by at least one processor, enable the at least one processor to cause a wireless communication station to:
receive from a mobile device a probe request frame including an indication that the wireless communication station is to respond to said probe request frame only when the wireless communication station comprises an Access Point (AP) capable to perform a wireless association, and that the wireless communication station is not to respond to said probe request frame when the wireless communication station comprises a Time of Flight (ToF) responder to perform a ToF measurement procedure without capability of performing the wireless association, said indication comprises a bit in an extended capabilities information element of said probe request frame; and
select to transmit a probe response frame to said mobile device if said wireless communication station comprises the AP capable to perform said wireless association, and select not to transmit the probe response if the wireless communication station comprises the ToF responder without capability of performing the wireless association.

21. The product of claim 20, wherein said instructions, when executed, cause the wireless communication station to transmit said probe response frame including an association capability indication to indicate that said wireless communication station is capable to perform said wireless association.

22. The product of claim 20, wherein said wireless communication station comprises the ToF responder, which is not capable to perform said wireless association, wherein said instructions, when executed, cause said wireless communication station to process said probe request frame and to select not to respond to said probe request frame.

* * * * *